United States Patent [19]

Pasker

[11] 4,295,408
[45] Oct. 20, 1981

[54] MUSIC TEACHING APPARATUS AND METHOD

[75] Inventor: John W. Pasker, 472 Tonawanda St., Buffalo, N.Y. 14207

[73] Assignee: John W. Pasker, Buffalo, N.Y.

[21] Appl. No.: 898,071

[22] Filed: Apr. 20, 1978

[51] Int. Cl.³ .................... G04F 5/02; G09B 15/04
[52] U.S. Cl. .................... 84/484; 40/472; 198/814; 434/181; 474/138
[58] Field of Search ............ 84/470 R, 477 R, 484, 84/470–485; 198/814, 493–496; 35/35 B, 76; 60/118, 472, 486, 512, 524–528; 74/242.8, 242.1 C, 242.12, 242.14 R

[56] References Cited

U.S. PATENT DOCUMENTS

| | | | |
|---|---|---|---|
| 936,297 | 10/1909 | Bowen | 198/496 |
| 1,456,670 | 5/1923 | Brown | 84/470 |
| 1,847,815 | 3/1932 | Church | 35/35 B |
| 3,328,898 | 7/1967 | Raba | 35/35 B |
| 3,369,439 | 2/1968 | Burdet | 84/483 |
| 3,463,043 | 8/1969 | Keir | 84/484 |
| 3,488,866 | 1/1970 | Raba | 35/35 B |
| 3,743,758 | 7/1973 | Del Castillo | 84/484 |
| 3,886,839 | 6/1975 | Del Castillo | 84/484 |

FOREIGN PATENT DOCUMENTS 65532  1/1914  Austria .................... 235/86

*Primary Examiner*—Lawrence R. Franklin
*Attorney, Agent, or Firm*—Raymond F. Kramer

[57] ABSTRACT

A music teaching apparatus, useful for requiring the student to play notes in correct relative timing and suitable for employment on a piano, includes a holder for sheet music, a continuous transparent web having a plurality of opaque covering sections thereon, such as strips of pressure sensitive tape of substantial width, so as to be capable of covering at least one note "width" and preferably more, with such opaque sections being positioned to permit (and require) continuous reading and playing of the music by the player ahead of the covering sections when the web is moved across the music, and means, such as a pair of vertical cylinders about which the web is held in tension, for continuously moving the web across the music and in contact with it or close to it (so as to prevent optical distortions). Preferably, individual opaque sections extend over a treble staff and a corresponding bass staff but do not extend to other treble and bass staffs. A method of teaching music is also disclosed.

17 Claims, 8 Drawing Figures

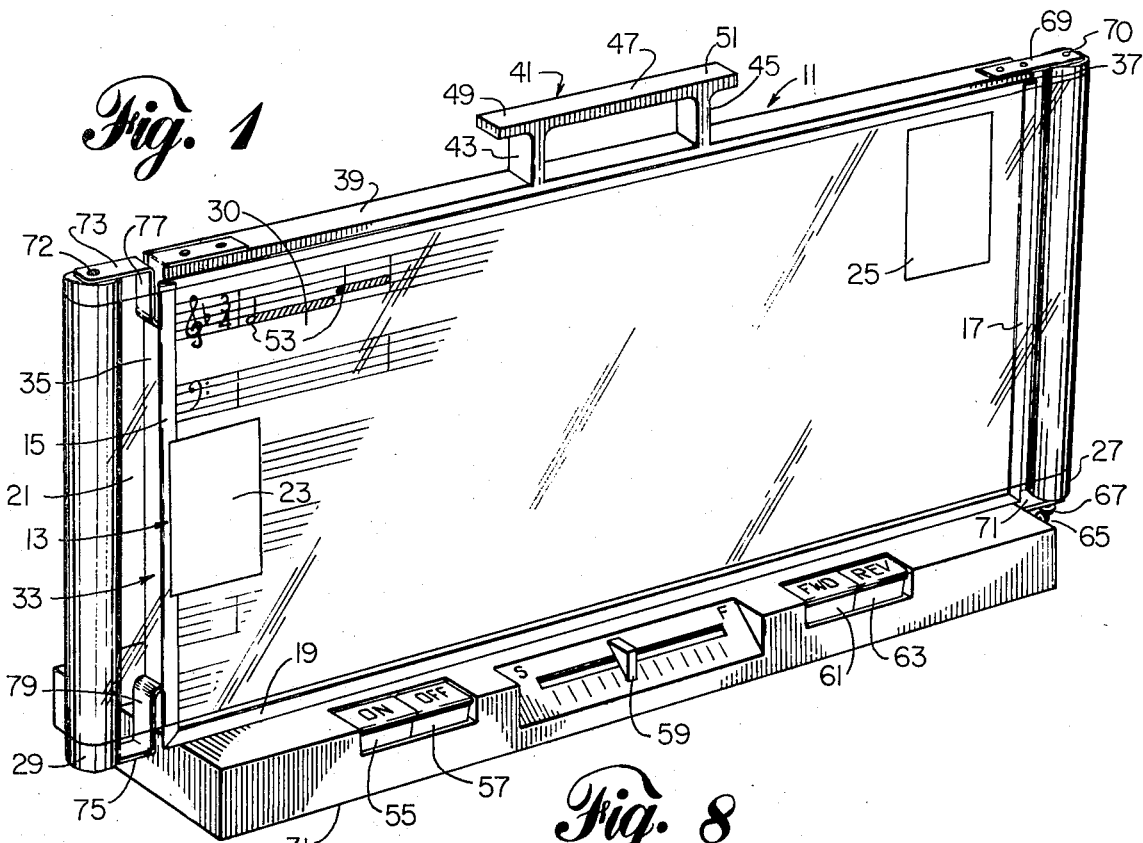
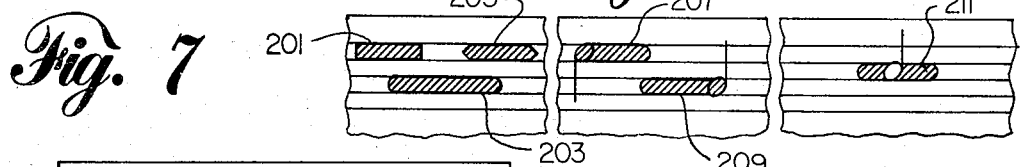
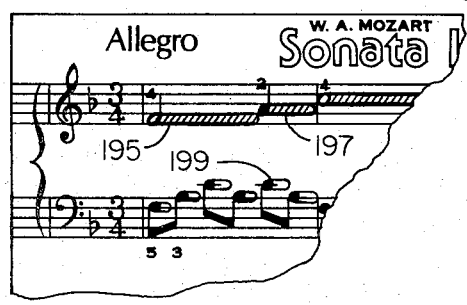
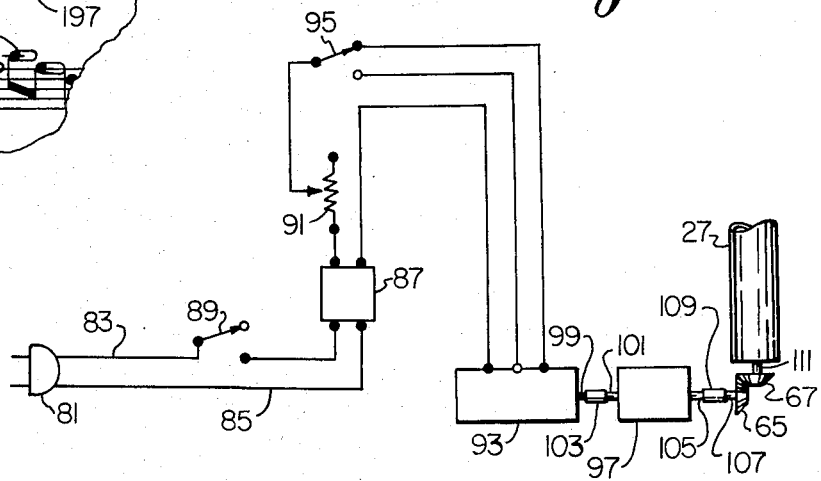

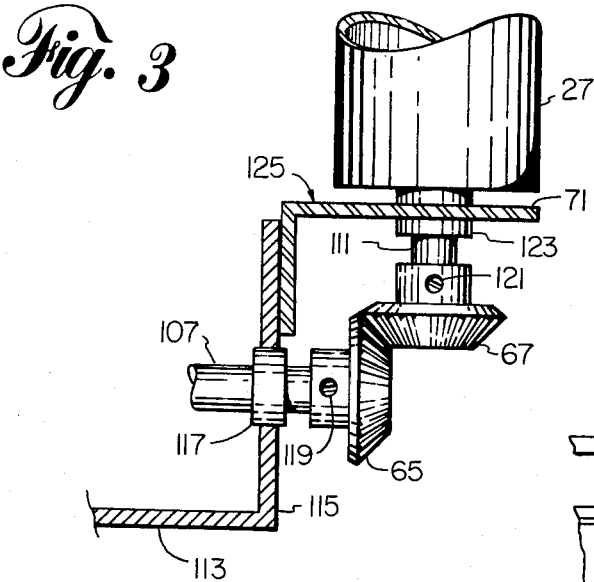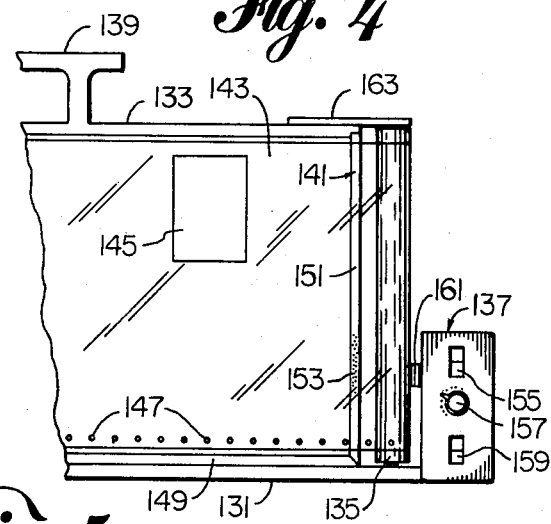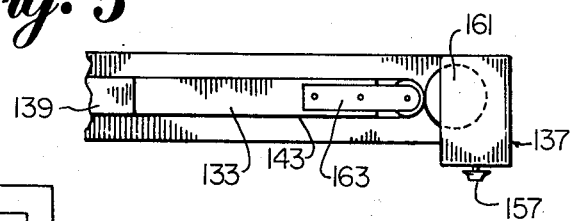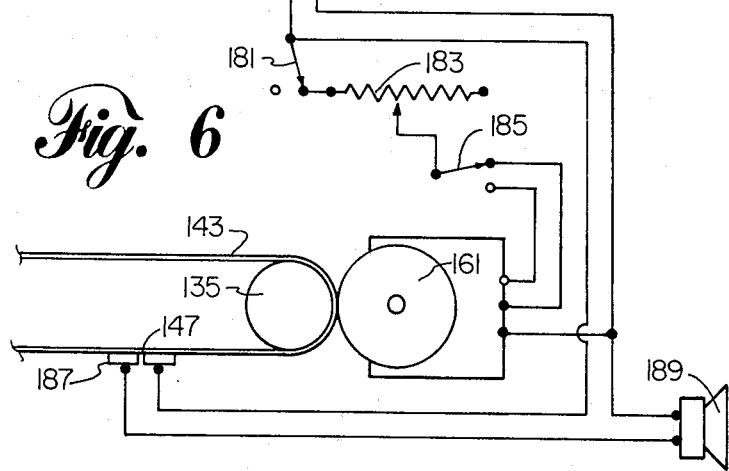

MUSIC TEACHING APPARATUS AND METHOD

This invention relates to a music teaching apparatus. More particularly, it relates to such an apparatus wherein a continuous transparent web or belt, having opaque covering sections or portions thereon, moves across music so that the covering sections obscure portions of the music, requiring the student or other player to play parts of the music before they become covered. Thus, the music teaching apparatus helps one to play in proper time and with correct note values. The invention also relates to various more detailed preferred embodiments of the described apparatus and similar music teaching apparatuses and "visual metronomes", which may include preferred means for tensioning the web or belt and for moving it with respect to the music.

In the teaching of music, especially with respect to performing on an instrument, in addition to a need for the student to master musical notation and become familiar with his musical instrument, it is important that he practice regularly so as to develop a musical sense and facility in playing the instrument. Mastery of timing, including the correct reading of the timing notations for each of the notes to be played and the playing of such notes and holding them for correct time values are essential to correct performance of music.

Various modified forms of musical notation have been employed in an effort to make visually apparent to the student the particular period of time for which a note is to be played. In one such form the length of a note is indicative of the length of time it is to be sounded or held. In one use of such notation a note of appropriate length is moved past an indicator, with the time for which the note is to be sounded being determined by the time it takes the note to pass the indicator. Thus, utilizing a vertical indicating line and essentially horizontal notes of varying lengths which are moved relative to the line, the longer the visual indication of the note the longer it is played and it is played and held while "in contact" with the line. Notes of the type mentioned are illustrated in U.S. Pat. Nos. 3,369,439 and 3,460,425. Whether utilizing such musical notations or standard musical notation to teach the correct timing for the playing of music, especially when the student is practicing without the assistance of his piano teacher, various means have been employed to indicate when and how long a note should be played. Metronomes may set a tempo but they do not indicate specific timing values for particular notes of the music to be performed. Various patents have addressed this problem, usually with limited success. For example, in U.S. Pat. No. 3,996,833 lights associated with a stand for music are serially illuminated and maintained on for periods of time which indicate how long particular notes should be sounded. U.S. Pat. No. 445,119 incorporates a vertical mechanical member which passes over the music in proper timing so as to establish when particular notes are to be played but it does not establish note values.

In U.S. Pat. Nos. 1,571,110 and 1,664,010 indicating rods and wires, respectively, are employed and are moved by endless chains over music to show when particular notes thereon are to be played. U.S. Pat. No. 3,803,971 utilizes an endless opaque belt having vertical transparent bar lines thereon lighted from behind so that a sheet of music placed in front of the belt is illuminated by the bar to indicate when particular notes are to be played. U.S. Pat. No. 3,942,404 employs an endless moving belt with vertical lines thereon, in front of which a stationary transparent sheet of music is placed so that the lines may be seen through the music to indicate when particular notes are to be played. In U.S. Pat. No. 3,886,839 a web or belt of transparent material moves across and in front of sheet of music with a vertical line on the belt for indicating when but not how long notes are to be played. U.S. Pat. No. 3,945,292 is similar in disclosure to U.S. Pat. No. 3,886,839 but utilizes a translucent sheet of music placed in front of a continuous, transparent, moving belt having vertical lines thereon backlighted so as to show on the music.

Although the patents mentioned represent some advances in the music teaching art they do not describe apparatuses which teach as satisfactorily as those of the present invention. Thus, utilizing a thin moving line on a transparent belt allows the student who is not sufficiently accomplished as to be able to play the music at correct speed to continue to view the note and to play it later out of correct timing. The described apparatuses that utilize moving belts do not teach note time values despite the fact that they require special music with measures of equal physical length (for a particular timing). Such disadvantages are overcome by the present invention and additionally, various structural features and improvements further perfect the apparatus, making it more functional, easier to employ and optically, more distortion-free.

In accordance with the present invention a music teaching apparatus comprises means to hold music in position for viewing by a player of a musical instrument, a continuous transparent web having a plurality of readily removable and respositionable opaque covers thereon for covering parts of the music when the web is in position with a face thereof between the music and the player, which opaque covers are each of size and shape so as each to cover the height of a staff of the music which are so positioned as to continuous reading and playing of the music by the player ahead of such covers when the web is being moved with respect to the stationary music, and means for continuously moving the web with respect to said music. In preferred aspects of the invention the covering sections, normally wide enough to cover at least a complete note, are of widths of at least a measure, are removably adhesively held to the web (pressure sensitive adhesive tapes are preferred) and cover a treble staff and a corresponding bass staff. Other important improvements of the music teaching apparatus of this invention include: a particular frame structure for holding the music; a base or end portion of the apparatus containing drive means, means for transmitting drive motion to means for moving the endless webs and control means; particular spring tensioning means of improved structure; capstan drive means for driving the endless web; timing indicia and means for activating light- and/or sound-producing means to indicate musical beats in response to such indicia; particular materials of construction of the transparent web; particular electrical systems; and means for cleaning the transparent belt and sometimes for promoting adhesion of it to the music so as to diminish optical distortion of the music by the transparent web.

The invention will be readily understood by reference to the present specification, including the description of preferred embodiments of the invention which follows, taken in conjunction with the drawing, in which:

FIG. 1 is a substantially front perspective view of an apparatus of the invention ready for operation with sheet music in place therein;

FIG. 2 is a combination wiring diagraphm and schematic representation of some of the mechanical components of the apparatus of FIG. 1 or which are employed in conjunction therewith, utilized to drive a continuous transparent belt of this invention;

FIG. 3 is an enlargement of a portion of bevel gear means like that of FIG. 2 for driving a vertical drive cylinder for moving the continuous transparent web, showing mountings of the gears thereof;

FIG. 4 is a partial front elevational view of a modified form of the apparatus of this invention with the electrical driving and control components being located at a side of the apparatus and with the base portion thinner (lower) than in the apparatus illustrated in FIG. 1;

FIG. 5 is a top plan view of the apparatus of FIG. 4;

FIG. 6 is a combination wiring diagraphm and schematic view of a portion of the mechanical part of the apparatus of FIG. 5, illustrating the presence of indicia, detecting means and metronome sounding means activated by detector detection of indicia on the continuous web, and the use of capstan drive means for moving said web;

FIG. 7 is a fragmentary view of music playable with the present apparatus, with note lengths indicating time values of the notes; and FIG. 8 is a view of several different types of musical notation that may be employed in utilizing the present invention.

In FIG. 1 numeral 11 represents the self-contained portable music teaching apparatus of this invention and includes: means to hold music in position, represented at least in part by music holding frame 13, which includes U-shaped or channel-shaped side members 15 and 17 (which also may be of a shape to form U's or channels with supporting frames to which they may be fastened) and preferably U-shaped bottom member 19; continuous transparent web or belt 21, having a plurality of opaque covering sections such as those designated by numerals 23 and 25 thereon, which are so positioned as to permit continuous reading and playing of the music by the player ahead of such covering sections, which belt, as depicted, moves from left to right across the music; and means, ultimately represented by drive cylinder or spindle 27 (employed with idler or tensioning cylinder 29), for continuously moving the web with respect to the music. As shown, the music is oblong usually being about as long as the base and from 15 to 40 cm. high, preferably 20 to 30 cm. high, e.g., 25 cm. All measures thereof are of equal lengths, so that when used with the present apparatus each measure will represent the same time.

The means for holding or supporting a sheet of music in proper position, in addition to the framing previously described, may also be considered to include a base 31 (which also includes within it various electrical switches, controls and other parts, including a drive motor and speed reducer) and a mounting frame 33, which includes vertical side members 35 and 37, horizontal top member 39 and a bottom member, not visible in the drawing, which members are appropriately fastened together to produce a rigid rectangular supporting frame which is mounted on base 31 and which has music holding frame 13 appropriately held thereto, as by screws, rivets, welding, solder, adhesive or other appropriate means, not illustrated. At the top of frame 33 is handle 41, which may be appropriately fastened to horizontal top member 39 of frame 33 or may be produced integrally with it. Handle 41 includes supporting legs 43 and 45 and upper horizontal section 47, having extension portions 49 and 51 thereon which extend sufficiently beyond the legs so as to facilitate wrapping of an electrical cord around such legs and between ends 49 and 51 and frame member 39. Base 31, on which the supporting frame 33 is mounted, is desirably as thin (of only little height) as feasible and although it should have sufficient width (depth) to support the apparatus in stable position, as when it is positioned on a piano, a piano music holder, a music stand or other support, is desirably narrow so as to make it useful with such supporting means, which may be relatively narrow or have a narrow ledge portion thereon on which the present apparatus will be placed. Thus, desirably, the thickness of such base portion will be no greater than about 10 cm. and preferably will be less than 5 cm., e.g., 1 to 4 cm., and normally the width will be no more than about 20 cm., preferably less than 15 cm. and most preferably less than 10 cm., e.g., 5 to 8 cm. The length of such base will be sufficient to accommodate the music being employed but will usually be about 25 to 100 cm. and preferably is from 36 to 75 cm., e.g., 45 cm.

The music 30, having musical notes 53 and other musical notations thereon, may include treble staffs only or treble and bass staffs (grand staffs) in combination. Preferably, such combinations, intended for both right and left hand playing, as of the piano, will be present. As may be noted, for correct timings the notes are elongated to indicate the values to be given to them and the measures of music are of equal physical length. The opaque covering sections 23 and 25 of web 21 may extend over only a single staff and over only a single note thereof at a time, but preferably extend over a combination of treble and bass staffs and extend over at least a quarter measure, preferably half a measure, more preferably at least a full measure and most preferably several measures, sometimes even covering all but a few notes, e.g., those in a measure or two, or even fewer.

In normal musical convention notes are read and played from left to right (and staffs are followed from top to bottom) and therefore the present transparent web with opaque covering sections thereon moves from left to right during teaching exercises. The leading edges thereof will cover the notes shortly after they should have been played, thereby making it difficult or impossible for the player to "cheat" and play the notes late. Of course, in some instances it will be possible for a student to play particular notes too soon but this is not the usual problem of students and may be corrected somewhat by positioning covering sections ahead of the other covering sections mentioned so that only a relatively small portion of the music is visible to the student. Covering sections 23 and 25 are so applied to web 21 that, after completion of playing of the last note(s) on the top staff or grand staff one may shift to playing the note(s) just ahead of the covering section on the next appropriate staff and the locations for positioning the covering sections will be chosen accordingly so that the music may be played in correctly timed sequence. An advantage of the present invention, wherein the covering sections are preferably made of removable and repositionable material, such as an opaque pressure sensitive adhesive tape, is that they may be positioned as desired for various types and sizes of sheet music and need not be keyed to one particular such type and size. Thus, the present apparatus is useful with almost all equal measure music and is readily convertible for use with different such music without requiring the use of new belts or the making of extensive adjustments or changes.

The means for continuously moving the web with respect to the music, while primarily a cylinder or other appropriate spindle, herein referred to as drive cylinder 27, also may be considered to include the various driving means which ultimately transmit motion to the cylinder and also to include idler or tensioning cylinder 29 and means for holding and biasing such cylinder so that it applies tension to transparent web 21, together with various mounting means. As is shown in FIG. 1, on base 31 there are present on-and-off switch buttons 55 and 57, respectively, speed control 59 and forward and reverse switch buttons 61 and 63, respectively, which regulate the activation, speed and direction of movement of drive cylinder 27 and thereby permit control of the speed and direction of movement of belt 21 and the covering sections thereon (covering sections 23 and 25 are shown but another covering section, for the third grand staff, is on the back of the web, hidden from the viewer). Thus, the student can slow the belt speed if he finds he can't keep up with it and he can increase such speed as he becomes more proficient at playing. Similarly, if he experiences difficulty in playing a particular section he may quickly reverse the belt so as to allow replaying of it and if he wants to study a complete passage he may move the covering sections out of the way. Various electrical and some mechanical relationships will be discussed further with respect to the descriptions of FIG'S. 2 and 3, wherein the elements of the drive means are best illustrated but it is seen in FIG. 1 that gear 65 transmits motion to gear 67 and through it to cylinder 27, which is mounted on frame 33 by means of straps 69 and 71 or other suitable mounting means. Web 21 is held in tension so that it frictionally contacts the surface of cylinder 27, by idling or tension cylinder 29, which is similarly mounted on supporting frame 33 by tensioning mounts 73 and 75, each of which includes a J-shaped or U-shaped (as illustrated) portion, a horizontal extension directed away from a main portion of the music teaching apparatus and longitudinally with respect thereto and means for mounting the idling, non-driving or tensioning cylinder between such horizontal extensions. The U-shaped portions of such members, identified by numerals 77 and 79, include walls and a curved intermediate portion and the walls thereof are normally initially pressed closer together, on installation of the tensioning roller, and are sufficiently springy to maintain enough force on such cylinder so as to hold the web in tension when they try to return to relaxed, normally U-shaped or J-shaped orientation. In a similar manner, as when the roller is equipped with centrally longitudinally positioned pins (70 and 72) fitting holes in the horizontal extensions in the J or U members, such horizontal extensions may be bent "outwardly" when the roller is being positioned and by their natural springiness will hold it in position. The simple structure illustrated maintains the desired tension on the belt and to a large extent such is adjustable, depending on the degree of springiness of the mounting J or U member strap material and the extent to which it is distorted from a permanent set when the tensioning roller is positioned. Further adjustments in tension may be obtainable by changing the positions of the mounts for the J or U members on frame 33 and such can be effected by employing slots or plural holes and fastening the members with screws for longitudinally adjustable mountings of the members on frame 33.

In FIG. 2 electrical plug 81, adapted to be fitted in a normal A.C. receptacle supplying 110-120 volts, is connected by wiring legs 83 and 85 to rectifying means 87 via on-off switch 89, shown in off position, which results upon depression of off button 57 (shown in FIG. 1). After conversion of the A.C. to D.C. by any suitable rectifying means, rheostat 91 or other suitable means for controlling the speed of drive motor 93 may be employed to adjust the voltage to such motor by moving of slide 59 (FIG. 1) to desired slow, fast or any intermediate position. The direction of the motor may be altered by pressing the forward or reverse buttons 61 and 63 (FIG. 1), thereby moving switch 95 to either the forward position, as shown, or reverse position. Motor 93 is connected to speed reducer or other appropriate gear box 97 by shafts 99 and 101 and intermediate coupling 103 and the speed reducer is connected to bevel gears 65 and 67 by shafts 105 and 107 and coupling 109. Driven bevel gear 67 is connected to driving cylinder 27 by shaft 111.

Although driving cylinder 27 is shown in FIG. 3 as a hollow cylinder of smooth surface, it may be solid, if desired, and the surface may be knurled, roughened, striated, polished or otherwise modified so as to promote best operation of the apparatus, with the continuous web being satisfactorily driven without objectionable slippage and yet without objectionable marking of the web or the creation of visible or weakening impressions on the web. In FIG. 3 are shown the bottom 113 and right side wall 115 of base 31 with bearing 117 positioned in the wall and with shaft 107 supported for rotation by said bearing. Bevel gear 65 is held to said shaft by set screw 119 and meshes with bevel gear 67, which is held to shaft 111 by set screw 121. Shaft 111 is positively connected to driving cylinder 27 and rotates in bearing 123 which is mounted on plate portion 71 of strap angle 125, which is held to wall 115. Instead of bevel gearing, as illustrated, various other methods of communicating a rotating driving force to roll 27 may be employed, one of which, a capstan drive, is shown in FIG'S. 4-6. However, other drive means may also be utilized, such as other gearing, belts and pulleys, flexible shafts and in some instanes, direct drives (from the speed reducers or the motors).

In FIG'S. 4 and 5 is illustrated a modified form of the present invention wherein components of the driving means are shown to a side of the apparatus so that the base may be made thinner and the music may be positioned closer to a supporting ledge, such as a music holder, on the musical instrument, e.g., a piano. Also, in FIG'S. 4-6 a capstan drive is illustrated and in FIG'S. 4 and 6 there are shown metronome or timing indicia along the bottom edge of the transparent web, with means for detecting such and creating timing sounds or visible signals in response thereto. The lengths of such signals may be varied, as desired, by changing the lengths of the indicia or by other suitable means.

In FIG. 4 base 131 supports frame 133, driving roller 135 and container 137 holding and supporting the driving motor, speed converter, switches, controls and capstan drive. Frame 133 has a handle 139 and has mounted on it holder 141 for positioning sheet music to be played. Mounted in tension between drive roller 135 and a corresponding tensioning roller, not illustrated, is transparent continuous web 143 having three opaque covering portions thereon (one, designated 145, is shown) and including indicia 147 which may be opaque marks, perforations, transparent sections, conductive materials or other detectable elements. Web 143 is preferably of such size and is so positioned that it does not contact the lower portion 149 of music support frame 141, thereby avoiding any scuffing of the web on any corner joints between such bottom and side portions of the music holder. On holder side 151, and more importantly, on a corresponding other side of said holder, not illustrated, there is present floc 153, bristles, cloth or other suitable substance for cleaning web 143. In some cases such material may contain a small quantity, usually 2 to 25% of the weight thereof, of an anti-static chemical, such as a quaternary ammonium halide, immidazolinium halide or a corresponding methyl sulfate, e.g., dimethyldistearyl quaternary ammonium chloride, to diminish any tendency of the web to attract static charges and dust but in other instances the material employed may accentuate the accumulation of static charges on the web so as to help it to adhere better to the music, thereby avoiding optical distortions due to curvatures and unequal distances between the web and the music. On-off switches 155, speed adjustment control 157 and reversing switches 159 regulate the rotation of roll 135 and the movement of web 143. Capstan drive 161 transmits the rotary drive force to roller 135 through belt 143, shown held to frame 133 by mounting means 163 (see FIG. 5) and roll 135.

In FIG. 6 plug 171 is shown connected to D.C. converter 173, which is connectable to receptacle 175, which is in the present teaching apparatus. (The plug, receptacle and associated wiring and connection are separable from the apparatus but are utilized with it). A source of direct current is thus communicable to the electrical circuit of the invention by wires 177 and 179. On-off switch 181, rheostat or potentiometer 183, reversing switch 185 and associated wiring control the rotation of capstan drive 161 and the speed of cylinder 135 and web 143. Mechanical means may be provided for engaging and disengaging the capstan drive with the belt and the driving cylinder 135 behind it. As illustrated, detecting means 187 detects the presence of conductive indicia 147 on web 143 and completes a circuit activating sounding means 189, which may be replaced or supplemented by illuminating means, not shown. Thus, a regular metronome or timing effect is obtainable in conjunction with the blocking effect of the covering portion of the transparent belt with respect to the music being played.

In FIG. 7 is shown a musical fragment wherein half-note 195 is shown as a coventional such note with a "tail" indicating, in combination, the actual note value. Similarly a quarter-note is identified by numeral 197 and an eighth-note by numeral 199. The small numerals indicate fingering. The measures of the illustrated music are of equal physical length. In FIG. 8 are illustrated teaching notes of various types. Notes 201, 203 and 205 have different end structures, square, rounded and pointed respectively, and notes 207, 209 and 211 illustrate variations wherein conventional notes are incorporated at the left, right and center portions respectively. Different colors and color mixtures may be utilized for the notes and the standard note portion may be black and white with the extension being colored, for example.

In operation the present apparatus is simplicity itself. The student merely places the apparatus in a convenient position with respect to the musical instrument being played, inserts the music (which will preferably be of the described special type, to be referred to in additional detail subsequently), starts the apparatus, adjusts the speed thereof and plays the notes as indicated, holding them for the times indicated. Although the present teaching device is directed primarily toward teaching proper timing in the playing of music, including the teaching of the proper time values to be given to particular notes, the music may contain, as illustrated in FIG. 7, fingering indications and quality, spirit or mood suggestions, together with tempo signs.

In learning to read and play music better with the invented apparatus the student preferably will start with a music sheet like those previously mentioned, on which music is specially written so that the horizontal length of a note is indicative of the time for which it is played and held. For example, in three-quarter time a half note will be two-thirds of a measure long and a following quarter note will be one-third of a measure long, as shown in FIG'S. 1 and 7. In FIG. 7 six eighth notes shown in the base staff portion of the grand staff are each one-sixth of a measure long. The measures will be of equal physical or linear lengths, unlike some music, wherein to save space they may be physically shortened, although played for equal times. Instead of showing the notes as illustrated, initially they may be horizontal bars, which may be squared, rounded or pointed at ends thereof but because it is desirable for the student to be led to play standard music as a result of his increased capability from using the present apparatus, such bars will be subsequently changed to music as indicated in FIG'S. 7 and 8 later to notes, preferably with indicators, such as vertical lines, to show when the notes are to be released (such a note should be played as soon as the opaque cover contacts it). In the learning process, just before conversion to regular sheet music (with measures of unequal physical lengths) the student plays standard music which, however, has been written on staffs of equal physical measure lengths, with the notes placed thereon and so spaced that they may be played when the covering portions of the web or belt first contact them. At this stage of learning, so that the notes may be viewed, if desirable, to remind the player of their values, the cover may be narrowed, so that it does not conceal the note after the striking thereof but allows it to be viewed so that the player can note its time value.

In a minor modification of the above teaching method there may be associated with the particular notes being played numeral or letter or other sign values (before musical notation is employed). Also, the speed of operation may be adjusted as the musical ability of the student increases. Of course, for difficult passages the reversing mechanism allows easy review without the need for the opaque portion of the belt to be moved the entire length thereof in the forward direction. To improve the sense of rhythm of the student and to accustom him to playing standard music with the aid of a metronome the means for activating light- and/or sound-producing means may be utilized to indicate musical beats accordingly during practice (and may indicate note lengths).

By the described method it is clear that the present apparatus and system of music teaching enables the student to improve his playing of a musical instrument with a minimum of practice and develops accurate playing habits and techniques. The music, utilized with the apparatus, gives instant correct interpretations of difficult musical passages and note values and reinforces such teaching as the student repeats the playing of the music. Thus, the apparatus and system enable quick and accurate self-teaching of music with minimal use of the services of a professional music teacher. By simplification of the music, at least at first, the present apparatus and system may be utilized to teach music to handicapped people and to allow them to teach themselves, thereby helping to give them a strong sense of accomplishment as well as recreational pleasure.

Various modifications and changes in the embodiments of the apparatus described may be employed, some of which will be referred to hereafter, but it should be understood that these do not limit the scopes of the appended claims. The means for holding the music in position for viewing by a player of a musical instrument is preferably a framework into which the music may be slid, but in some cases provision may be made for clipping the music in place therein. Behind the music there may be placed resilient polymeric plastic or rubber foam, springs, cardboard or paper backing to press the music forward into good contact with the continuous transparent web moving over it, so as to diminish optical distortions. (Usually the distance between web and music will be 0.0 to 2 mm., preferably 0.0 to 1 mm.). The frame will desirably be covered by a fabric, cloth or floc or other coating at at least the "upstream" end thereof so as to protect and clean the transparent web and in some cases this coating may be treated with an anti-static chemical, such as a quaternary ammonium halide, e.g., dimethyldistearyl quaternary ammonium chloride, so as to diminish dust pick-up by the web from the music. Similarly, a cleaning surface may be provided to clean the forward side of the web, nearer to the player. The frame at the "downstream" or drive end may be similarly covered by such a material to protect the web and supplement cleaning thereof on one or both sides.

The continuous transparent web may be made of any suitable transparent material and in some cases it may be made of "discontinuous" or open material, such as one of lacy or veil-like structure but normally it is preferred to utilize a completely continuous transparent polymeric plastic. Various such plastics may be employed, such as polyethylene terephthalate (Mylar ®), polyvinyl halide, preferably polyvinyl chloride, polyvinylidene chloride, cellulose acetate, polyethylene, cellophane, polyesters, polyethers, polymethylmethacrylate (alkyd resins), polyurethanes and other suitable plastics. Some of these tend to pick up static charges and also may tend to pick up dust and in such cases spraying on of an anti-static agent is highly desirable. In other instances if the static charges are appreciable they may promote closer contact between the music and the moving web and in such instances it may not be desirable to remove the charges. Thus, in these cases the employment of an anti-static agent may be omitted but the physical cleaning of the film of any adhered dust may still be desirable. The web size employed will normally be such as to accommodate the music and preferably the web will not extend vertically far enough so as to be scratched by contact with any unfinished or corner portions of the framing but such contact may be permitted when there is no danger of scratching or distorting the web thereby. Web thickness may vary but usually will be within the range of 0.1 to 3 mm., preferably 0.5 to 1.5 mm. The music frame will usually be of aluminum, aluminum alloy or plastic but wood is also useful. Its size will be like that of the music with height:width ratio usually being in the range of 1:5 to 1:1, preferably 1:3 to 3:4.

The drive cylinder employed may be changed to any other suitable cross-sectional shape although cylindrical is preferred and the surfaces may be modified for best frictional (or cog) contact with the web without distorting it objectionably. Normally, hollow cylinders will be utilized and they will be vertically positioned but it is possible to change the orientation of the drive and idling cylinders and of the music. The driving motors may be low voltage D.C. motors, e.g., 12 volts or 6 volts, variable D.C. voltage motors, driven by battery power, e.g., from a rechargeable battery, or by D.C. rectified from A.C., e.g., half wave D.C., or A.C. motors, preferably 110 volts. Speeds may be modified by gears, transformers, pulley-belt arrangements, rheostats, etc., as desired. Capstan and other drives may be employed. The drive and idler rollers may be mounted in various ways, utilizing bearings, pin mounts, etc. and may be driven by various means, including direct gearing, belting, flexible drive, etc. Supplemental tensioning devices may be employed to ensure proper drive-web contact. Reversing mechanisms may be electrical or mechanical. Metronome signal pickups may be of various types and in the unit as illustrated in FIG. 6, a switch may be provided so that the metronome may be turned off, when desired.

The opaque or covering section of this invention is preferably an adhesive tape wherein the adhesive is any suitable plasticized rubber adhesive or similar material presently employed in the making of such pressure sensitive tapes. Of course, the adhesive should be one which will hold satisfactorily to the web and will be removable from it (and not from its substrate) for repositioning when desired. The substrate is any suitable polymeric plastic, e.g., Mylar, nylon, polyethylene, or may be rubber or other sufficiently elastic material. Instead of utilizing pressure sensitive adhesives the tape or covering portion may be held to the web magnetically, electrostatically, mechanically, e.g., by clips or by fitting into perforations on the web, and in some cases there may be painted onto the web an opaque covering which is readily removable, as by a solvent which does not adversely affect the web material.

It is evident from above that a new and useful apparatus and accompanying teaching method have been described for simplifying and improving the teaching of students to play musical instruments, such as the piano. With the present apparatus and the described music and by following the mentioned teaching method, wherein one progresses in playing from musical notations of numerals (if desired) to bars to notes plus bars to notes on equal measure music and then to conventional music, one can learn to play quickly and economically. In fact, one can learn to play a whole piece in a short time, e.g., a few hours to a few days, depending on difficulty, without the aid of a teacher.

The invention has been described with respect to illustrations and preferred embodiments thereof but is not to be limited to these because it is evident that one of skill in the art with the present specification before him, will be able to utilize substitutes and equivalents therein without departing from the spirit of the invention.

What is claimed is:

1. A music teaching apparatus comprising means to hold music in position for viewing by a player of a musical instrument, a continuous transparent web having a plurality of indicia thereon for indicating notes of the music to be played when the web is in position with respect to the music and the player, said indicia being so positioned as to permit continuous reading and playing of the music by the player ahead of one thereof when the web and the indicia are moving with respect to the music, means for continuously moving the web with respect to the music, and J-shaped or U-shaped spring members, one each at the top and bottom respectively of the apparatus at an end thereof and at a side of the continuous web, for applying a spring force to the web to hold it in tension, which spring members each have horizontal extensions directed away from the main portion of the apparatus and longitudinally with respect thereto and have mounted on such extensions a non-driving cylinder which applies tension to the web.

2. A music teaching apparatus comprising means to hold music in stationary position for viewing by a player of a musical instrument, a continuous transparent web having a plurality of readily removable and repositionable opaque covers thereon for covering parts of the music when the web is in position with a face thereof between the music and the player, which opaque covers are each of size and shape so as each to cover the height of a staff of the music and which are so positioned as to permit continuous reading and playing of the music by the player ahead of such covers when the web is being moved with respect to the stationary music, and means for continuously moving the web with respect to said music.

3. An apparatus according to claim 2 wherein the music is in sheet form, the covers on the web are on a plurality of staffs, are each substantially vertical and are each of sufficient width to cover at least one quarter of the width of a measure, and the means for moving the web moves it across the music.

4. An apparatus according to claim 3 wherein the opaque vertical covers are of the width of at least a measure.

5. An apparatus according to claim 2 wherein a plurality of covers is adhesively held to the transparent web by a pressure sensitive adhesive.

6. An apparatus according to claim 5 wherein the adhesively held opaque covers are pressure sensitive adhesive tapes at least one quarter of a measure in width which cover a treble staff of the music and a corresponding bass staff.

7. An apparatus according to claim 5 wherein the heights of the pressure sensitive adhesive tape covers are such that they cover no more than two staffs and cover at least a measure of each such staff.

8. An apparatus according to claim 7 which is portable and self-contained and includes two rotatable vertical cylinders at ends thereof adapted to maintain a tension against the continuous transparent web, which web is mounted about said cylinders so that a face of said web is nearer to the player than the other web face and nearer to the player than the music and is maintained in contact with said music or adjacent to said music and at a uniform small distance from it, with the music being mounted in a three-sided, thin, rectangular frame having U-shaped bottom and side members, with the fronts of which side members the continuous transparent web makes contact when it moves across the music.

9. An apparatus according to claim 8, which is portable and self-contained and which includes a base portion including drive means, means for transmitting motion of the drive means to one of the vertical cylindrical members, means for adjusting the speed of the drive means and means for changing the direction of movement of the drive means and thus changing the direction of rotation of the cylindrical drive member and the direction of movement of the continuous web.

10. An apparatus according to claim 9 wherein the means for maintaining the continuous web in tension is a pair of J-shaped or U-shaped members, one each at the top and bottom respectively of the apparatus at an end thereof, each having horizontal extensions directed away from a main portion of the apparatus and longitudinally with respect thereto, on which extensions is mounted a non-driving cylinder of the pair of said cylinders by which the continuous transparent web is held in tension, with the walls of the J or U, together with the curved portion thereof, being sufficiently springy to maintain enough force on the cylinder so as to hold the web in tension.

11. An apparatus according to claim 8 which is portable and self-contained and which includes a narrow base so as to allow the sheet music to be near to the surface of a support for the apparatus, and a side portion including electrically operated drive means, means for starting and stopping the drive means, means for transmitting motion of the drive means to one of the vertical cylindrical members, means for adjusting the speed of the drive means and means for changing the direction of movement of the drive means.

12. An apparatus according to claim 11 wherein the means for transmitting motion of the drive means to one of the vertical cylindrical members is a capstan drive which frictionally transmits said motion to said web and said cylindrical member by contacting said web and pressing it against one of the two vertical cylinders.

13. An apparatus according to claim 12 wherein the transparent web includes longitudinally located and spaced timing indicia thereon and the apparatus includes means for detecting the presence of such indicia as they move along on the web and includes means for activating light- and/or sound-producing means to indicate musical beats.

14. An apparatus according to claim 13 wherein the transparent web is of a synthetic organic polymeric plastic.

15. An apparatus according to claim 14 wherein the drive means is a D.C. motor and the apparatus includes an electrical jack for connection to an external D.C. converter or includes a rechargeable battery so as to avoid external wiring which could interfere with the playing of the musical instrument.

16. A method for teaching a musical instrument which comprises having a student play on a musical instrument notes indicated on a stationary sheet of music by horizontal bar shaped indicia and having the student hold said notes down for periods of time indicated by the lengths of such bars on said sheet of music, as the bars are being covered by a covering means passing over them at a uniform rate, which covering means is a continuous transparent web having a plurality of readily removable and repositionable opaque covers thereon for covering parts of the music when the web is in position with a face thereof between the music and the student, which opaque covers are each of size and shape so as each to cover the height of a staff of the music and which are so positioned as to permit continuous reading and playing of the music by the student ahead of such covers when the web is being moved with respect to the music, while the music is being held stationary, repeating such operation with the bars on the sheet music being replaced by notes of conventional type with the exception that the horizontal lengths of the notes correspond to the lengths of time periods for which they are being sounded, repeating the operation with notes in conventional form on the sheet music with the periods for which the notes are being sounded being the same, and playing the music in conventional form without the use of the covering means.

17. A method for teaching playing of a musical instrument, with the aid of a music teaching apparatus comprising means to hold music in stationary position for viewing by a student, a continuous transparent web having a plurality of readily removable and positionable opaque covers thereon for covering parts of the music when the web is in position with a face thereof between the music and the student, which opaque covers are of size and shape so as each to cover the height of a staff of the music and which are so positioned as to permit continuous reading and playing of the music by the student ahead of such covers when the web is being moved with respect to the stationary music, and means for continuously moving the web with respect to said music, which comprises having the student play on a musical instrument notes indicated on a stationary sheet of music by horizontal bar shaped indicia and hold said notes down for periods of time indicated by the lengths of such bars as they are being covered by an opaque cover of the web passing over them, repeating the operation with the bars on the sheet music being replaced by notes of conventional type with the exception that the horizontal lengths of the notes correspond to the lengths of time periods for which they are being sounded, repeating the operation with notes in conventional form on the sheet music and playing the notes for times equal to those for which the notes were previously played, and playing the music in conventional form without the use of the apparatus.

* * * * *